Patented Apr. 3, 1951

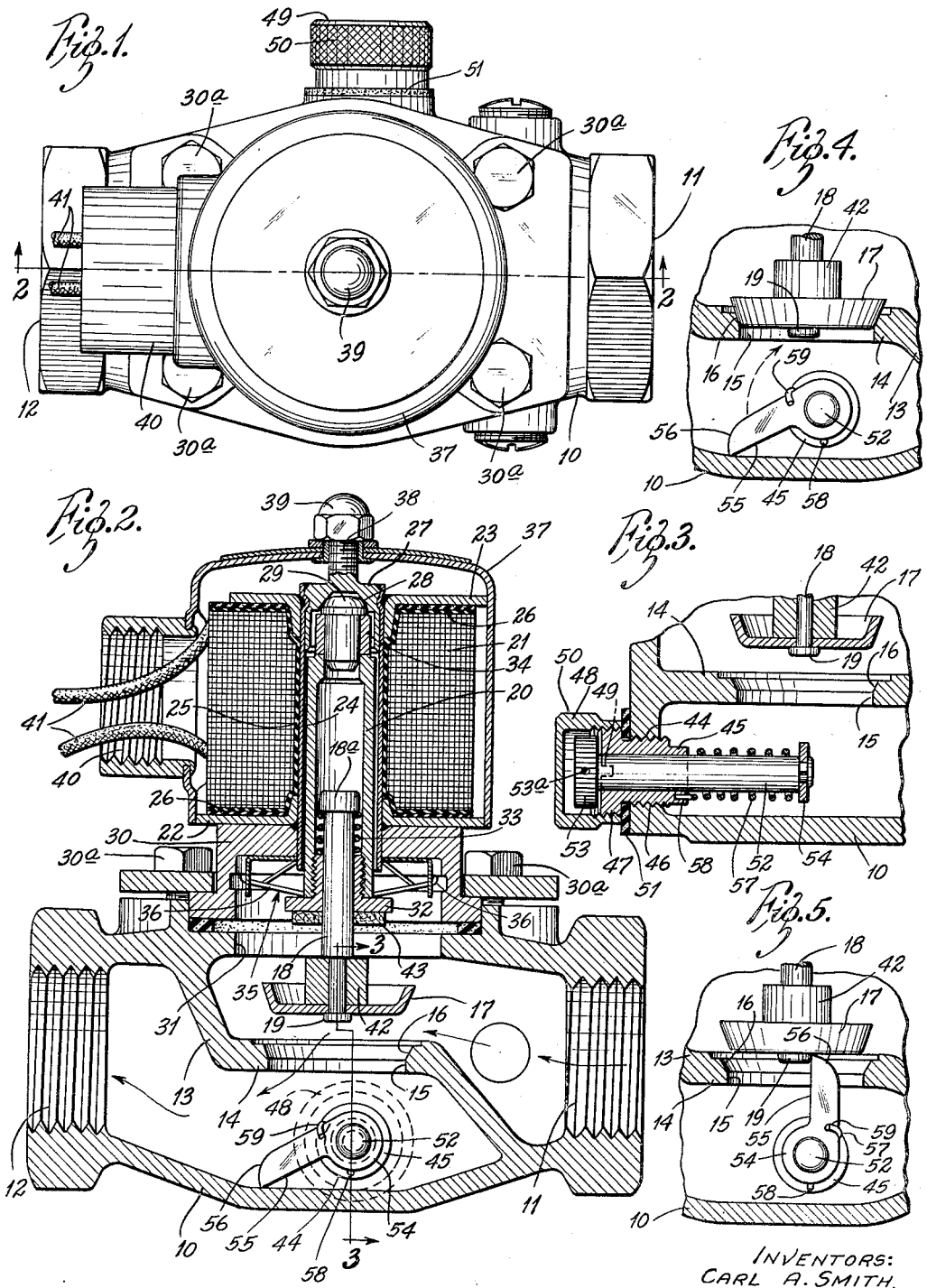

2,547,098

UNITED STATES PATENT OFFICE 2,547,098

ELECTROMAGNETIC VALVE

Carl A. Smith, Ferguson, and Joseph A. Wasser, Kirkwood, Mo., assignors to Missouri Automatic Control Corporation, St. Louis, Mo., a corporation of Missouri Application January 9, 1948, Serial No. 1,317

5 Claims. (Cl. 137—139)

1

This invention relates generally to electromagnetically operated valves, and has particular reference to the combination therewith of manual means for actuating the valve in event of failure of electrical power.

It is an object of the present invention to provide an improved solenoid valve structure incorporating novel means for manually opening the valve in event of failure of electrical power.

Another object is to provide a solenoid valve device having novel manual means for moving the valve to an open position and which means is movable in a valve opening direction to a latched position in which the valve is held open during inoperation of the solenoid.

Another object is to provide in a solenoid valve device a novel manual operator by which the valve may be moved to an open position in which it is latched during inoperation of the solenoid and from which position it is automatically released upon resumption of operation of the solenoid.

More specifically it is an object to provide an electromagnetically actuated valve device having a reciprocating valve which is normally biased to a closed position and is opened upon energization of the electromagnet, and which has incorporated therein a spring returned manual actuator adapted to engage the valve for moving it openward to a position in which the manual actuator and valve are jointly latched against return, when the electromagnet is inoperative, and from which position the manual actuator is released to return to its normal position by a further opening movement of the valve by the electromagnet upon its resumption of operation.

A further object is to provide in a solenoid valve device having a normally closed valve, a novel spring returned manual valve actuator having rotational and axial movement by which the valve may be moved openward to a position in which the valve and actuator are jointly latched, and by which the valve and manual actuator may be jointly released to return to their normal positions by axial movement of the manual actuator.

Further purposes and advantages of the present invention will become apparent in the following description of its construction and explanation of its operation when read in connection with the accompanying drawing.

In the drawing,

Fig. 1 is a plan view of a solenoid valve constructed in accordance with the present invention.

Fig. 2 is a longitudinal section taken on line 2—2 of Fig. 1. In this view the valve is shown in the open position to which it is moved when the electromagnetic actuator is energized, the manual actuator being shown in its normal inoperative position.

2

Fig. 3 shows a fragmentary portion of the valve body taken on line 3—3 of Fig. 2 showing the manual actuator mounted therein.

Fig. 4 is a part sectional view of the lower part of the valve body showing the valve in a fully closed position and the manual actuator in its normal position.

Fig. 5 is a part sectional view of the lower part of the valve body showing the valve in the open position to which it is moved by the manual actuator and in which position the valve and actuator are jointly latched.

Referring to the drawing a valve body is indicated at 10. The valve body has an inlet 11, an outlet 12, and a wall 13 separating the inlet and outlet. Wall 13 has a horizontal portion 14 which has a circular opening or port 15 therethrough. A valve seat 16 is formed on the inlet side in port 15 which is adapted to be engaged by a cup shaped valve 17. Valve 17 has a stem 18 attached thereto by the upsetting of its lower end to form a head as indicated at 19. The head 19 has a further important function to be explained hereinafter. The valve stem 18 is arranged to telescope in a generally cylindrical, hollow core member 20 constructed of magnetic material.

There is a winding 21 mounted on top of the valve body 10 which attracts the core 20 when energized. The winding 21 is laid on a spool comprising a lower flange 22, an upper flange 23, and a tubular connecting member 24. The flanges 22 and 23 are of magnetic material while the connecting tube 24 is of non-magnetic material. The flanges and tube are suitably attached as by soldering. The winding is suitably insulated from the spool by insulators 25 and 26. The tube member 24 loosely receives the core 20 and it is fitted at its upper end with a hollow closure plug 27 having a tapered portion 28 therein which cooperates with a rounded end closure plug 29 in the upper end of the hollow core 20 to center the core in the tube at its upper end.

The winding is attached to the top of the valve by means of an inverted cup shaped and flanged attaching member 30. The lower flange 22 of the spool being welded or brazed to the member 30 and the member 30 being attached in turn to the valve body by the attaching screws 30a. The upper side of the valve body is provided with a large circular opening 31 concentric with and approximately of the same diameter as the inside diameter of the cup 30. At its lower end the hollow core 20 is fitted with a perforated closure plug 32 which slidably receives the valve stem 18. The upper end of the valve stem is provided with a head 18a which limits its outward travel with respect to the core. There is a spring 33 between the upper end of plug 32 and the head of the valve stem which eliminates the noise of metal to metal contact as the valve is actuated. The upper end of hollow core 20 is fitted with a shading coil 34 for a purpose well understood in the art.

Mounted in the cup member 29 is a centering device generally indicated at 35 which has centering fingers 36 engaging the sides of the closure plug 32. The construction and operation of this centering device is fully shown and described in Patent No. 2,360,945, issued October 24, 1944, to Claude M. Garner. The winding 21 is provided with a cup shaped cover 37 of magnetic material which closely fits over the flange 22 at its lower open end and which is attached to the spool at its upper closed end by a stud 38 formed as a part of the tube closure member 27 and by a nut 39. The cover 36 is provided with an internally threaded side outlet 40 thru which the winding leads 41 pass. The outlet is adapted to receive threaded rigid electrical conduit and it will be noted that, by provision of the attaching means shown and described, the coil may be rotated with respect to the valve body by merely loosening the attaching screws 30a. By this provision the outlet 40 may be positioned to accommodate the conduit.

The valve stem 18 is also provided at its lower end with a spacer 42 of substantially larger diameter than the valve stem and there is a leather bumper 43 on the lower surface of the closure plug 32. The spacer 42 provides a shoulder for limiting telescoping of the valve stem within the core and the leather bumper 43 eliminates a noisy metal to metal contact between the closure plug and the spacer when the core drops upon deenergization of the coil. Telescoping of the valve stem in the core 20 permits the core to accelerate to some extent upon energization of the winding before the valve is lifted from its seat, thus imparting a hammer blow to the valve which will break it from its seat if there is any tendency for it to stick due to gummy percipitates from the fluid passing therethrough.

There is a threaded bore 44 in the side wall of the valve body and near the bottom thereof having its axis transverse to the axis of the valve assembly and being spaced horizontally therefrom. The bore 44 opens into the valve body on the outlet side of the wall 13. Fitted into the bore 44 is a hollow, externally screw threaded guide member 45 having a screw threaded portion 46 adapted to engage the thread bore 44 and having an enlarged screw threaded portion 47 adapted to receive an internally screw threaded cap 48. The guide member 45 is provided with a screw driver slot 49 and the cap 48 is provided with a knurl surface 50. There is a pliable sealing gasket 51 between the enlarged portion 47 of the guide member and the valve body.

Slidably fitted in the guide member 45 is a horizontal actuating rod 52 having a knurled or fluted head 53 rigidly attached to the outer end thereof by a screw 53a. There is an arm 54 rigidly attached at one end to the inner end of rod 52. The arm 54 has a straight side 55 which under certain conditions engages the upset head 19 on the end of the valve stem to latch the valve open. The other side of the arm is provided with an arcuate surface 56 near its outer end which engages the valve to move the valve openward as the actuating rod 52 is rotated. There is a spring 57 surrounding the actuating rod 52 and having one of its ends attached to the guide member as indicated at 58 and its other end attached to the arm 55 as indicated at 59.

The spring 57 acts torsionally on the rod 52 to rotate the arm counterclockwise to its normal returned position as shown in Figs. 2 and 4. The spring 57 also urges the rod axially and therefore the arm 54 toward the right in Fig. 3, that is, inwardly. In its innermost normal position, the arm 54 is aligned substantially with the vertical center line of the valve assembly and the upset head 19, see Fig. 3. The center line of the actuating rod 52 is spaced horizontally from the vertical center line of the valve assembly a distance substantially equal to one half the diameter of the upset head 19 and the straight side 55 of the arm 54 intersects the center line of the rod 52, so that the straight side 55 is substantially vertical, as shown in Fig. 5 when it engages the head 19. The arm is therefore substantially in a dead center position wherein the downward thrust due to the weight of the valve assembly is ineffective to rotate the arm 54.

*In operation*

In normal operation when the winding 21 is energized by a source of electrical energy (not shown) the core 20 is moved to its uppermost position, lifting valve 17 upward to the position shown in Fig. 2. Upon deenergization of the winding the core is released, and the valve 17 falls to its seat. The falling core contacting the spacer 42 and adding valve closure pressure.

In the event, however, of temporary failure of the source of electrical energy and it is desirable that flow through the device be continued during this period, as in the case wherein the device controls the flow of fuel to a space heater, the valve may be opened and set in an open position in the following manner: The knurled closure cap 48 on the manual actuator is removed, the head 53 is then rotated manually counterclockwise as far as it will go. As the head 53 is rotated the curved surface 56, near the free end of arm 54, contacts the valve 17 lifting it vertically from its seat. Rotation is continued until the arm 54 contacts the rim of the port 15. At this time the head 53 is released and the spring 57 then rotates the arm in a return direction until the straight side of arm 54 contacts the side of the upset head 19.

At this point the arm 54 is prevented from returning further. The end of the arm is at its highest point and the weight of the valve and core is applied to the shaft 52 in substantially a straight line intersecting its center. The valve and arm therefore act conjointly to latch each other in this position. It will be noted that the valve 17 is not lifted as far from its seat by the arm 54, see Fig. 5, as it is by the electromagnetic actuator, see Fig. 2. Upon return of electrical power and the resumption of operation of the electromagnetic actuator, the valve 17 will be lifted farther openward releasing the arm 54 and permitting its automatic return to its normal position in which it is stopped against the bottom wall of the valve body and in which position it is inoperative.

If however, it is anticipated that failure of electrical power will be prolonged and it is desirable to intermittently open and close the valve manually, the valve may be tripped from the manually set position by grasping the head 53 and pulling outwardly against the spring 57. As the head 53 is pulled outwardly, the arm 54 will be moved out of its normal alignment with the upset head 19 and it will be permitted to rotate under urging of spring 57 to an inoperative position.

The foregoing description and accompanying drawing are intended to be illustrative, not limiting. The scope of the invention being set forth in the appended claims.

We claim:

1. In a device of the class described, a valve body, a valve in said body, means biasing said valve in a closing direction, a shaft journalled in the wall of said body for rotational and axial movement and extending interiorly and exteriorly thereof, said shaft being arranged substantially perpendicular with respect to the direction of movement of said valve, a handle on the exterior end of said shaft, spring means normally urging said shaft axially inwardly and in one rotational direction, an arm on the interior end of said shaft having a free end adapted to engage said valve and to move it openward as said shaft is manually rotated in an opposite direction, and a shoulder on said valve adapted to engage the free end of said arm as it is moved to its maximum valve opening position, thereby to prevent the rotational return of said arm and to hold said valve in an open position, said arm being movable axially out of engagement with said shoulder by the manual outward movement of said shaft.

2. In a device of the class described, a valve body, a reciprocating valve in said body, means biasing said valve in a closed position, a shaft journalled in the wall of said body for rotational and axial movement and extending exteriorly and interiorly thereof, said shaft having its interior end adjacent said valve and being arranged transversely with respect to the travel thereof, a handle on the exterior end of said shaft, spring means normally urging said shaft axially inwardly and in one rotational direction, an arm on the interior end of said shaft having a free end adapted to engage said valve and to move it openward as said shaft is manually rotated in an opposite direction, said shaft being located with relation to said valve so that said arm is substantially aligned with the direction of travel of said valve when in its maximum valve opening position, and a shoulder on said valve adapted to engage the free end of said arm as it is rotated to its maximum valve opening position, whereby said arm and valve are conjointly latched against return, said arm being movable axially out of engagement with said shoulder thereby to release said arm and said valve.

3. In combination, a reciprocating valve, means biasing said valve in a closed position, an electromagnetic actuator for moving said valve openward a predetermined amount when energized, and a manual actuator for opening said valve when said electromagnetic actuator is inoperative comprising a shaft mounted for axial and rotational movement, said shaft having an inner end adjacent said valve and being arranged transversely with respect to the direction of travel thereof, spring means normally biasing said shaft axially in a direction toward said valve and rotationally in one direction, an arm on the inner end of said shaft having a free end adapted to engage said valve and to move it openward as said shaft is rotated in an opposite direction, said arm being of such length as to move said valve openward less than said predetermined amount when rotated to its maximum valve opening position, and said shaft being located with respect to said valve so that said arm is substantially aligned with the direction of travel of said valve when in its maximum valve opening position, a handle on the outer end of said shaft, and a shoulder on said valve adapted to move into engagement with the free end of said arm as it is rotated to its maximum valve opening position, whereby said arm and valve are conjointly latched against return, said arm being movable axially out of engagement with said shoulder as said shaft is manually pulled outwardly thereby to release said arm and said valve.

4. In combination, a valve body having an inlet, an outlet, and a separating wall therein defining inlet and outlet chambers, a port in said wall, a valve in said inlet chamber for controlling said port, means biasing said valve in a closed position, an electromagnetic actuator having communication with said inlet chamber for moving said valve openward a predetermined amount when energized, and a manual actuator for opening said valve when said electromagnetic actuator is inoperative comprising a shaft journalled in the wall of said body for both rotational and axial movement and projecting into said outlet chamber, said shaft being substantially transverse to the direction of travel of said valve, spring means normally urging said shaft inwardly and rotationally in one direction, an arm on the inner end of said shaft having a free end aligned with said port and adapted to engage said valve and to move it openward as said shaft is rotated in an opposite direction, said shaft being arranged with relation to said valve so that said arm is substantially aligned with the direction of travel of said valve when in its maximum valve opening position, and said arm being of such length as to open said valve less than said predetermined amount, a handle on the outer end of said shaft, and a shoulder on said valve adapted to move into engagement with the free end of said arm as it is moved to its maximum valve opening position for preventing the return of said arm and said valve, said arm being movable axially out of engagement with said shoulder.

5. In a device of the class described, a valve body, a valve in said body, means biasing said valve to a closed position, a shaft journalled in the wall of said body for rotational and axial movement and extending interiorly and exteriorly thereof, said shaft being arranged substantially perpendicular with respect to the direction of movement of said valve, a handle on the exterior end of said shaft, spring means for urging said shaft rotationally in one direction, a member on the interior end of said shaft adapted to engage said valve and to move it openward as said shaft is rotated in an opposite direction, and a shoulder on said valve adapted to engage said member as it is moved to its maximum valve opening position, thereby to prevent rotational return of said member and to hold said valve in an open position, said member being movable out of engagement with said shoulder upon axial movement of said shaft.

CARL A. SMITH.
JOSEPH A. WASSER.

REFERENCES CITED

The following references are of record in the file of this patent:

UNITED STATES PATENTS

| Number | Name | Date |
|---|---|---|
| 2,238,401 | Shaw | Apr. 15, 1941 |